(12) United States Patent
Dharmapurikar

(10) Patent No.: US 9,001,135 B2
(45) Date of Patent: Apr. 7, 2015

(54) METHOD AND MECHANISM FOR DELIVERING APPLICATIONS OVER A WAN

(75) Inventor: Makarand Dharmapurikar, Fremont, CA (US)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 13/234,948

(22) Filed: Sep. 16, 2011

(65) Prior Publication Data

US 2012/0069036 A1    Mar. 22, 2012

Related U.S. Application Data

(60) Provisional application No. 61/384,265, filed on Sep. 18, 2010.

(51) Int. Cl.

| | | |
|---|---|---|
| G06T 15/04 | (2011.01) | |
| G09G 5/00 | (2006.01) | |
| G06T 15/00 | (2011.01) | |
| G06F 3/14 | (2006.01) | |
| G06T 15/30 | (2011.01) | |
| G06T 15/40 | (2011.01) | |
| G09G 3/00 | (2006.01) | |

(52) U.S. Cl.
CPC ............... *G06T 15/005* (2013.01); *G06F 3/14* (2013.01); *G06T 15/30* (2013.01); *G06T 15/40* (2013.01); *G09G 3/003* (2013.01); *G06T 2200/16* (2013.01); *G06T 2210/36* (2013.01); *G09G 2340/02* (2013.01); *G09G 2350/00* (2013.01); *G09G 2360/08* (2013.01); *G09G 2370/022* (2013.01)

(58) Field of Classification Search
None
See application file for complete search history.

(56) References Cited

U.S. PATENT DOCUMENTS

| | | | | | |
|---|---|---|---|---|---|
| 5,675,773 | A | * | 10/1997 | Devic .............................. | 345/522 |
| 5,905,507 | A | * | 5/1999 | Rossignac et al. ............ | 345/440 |
| 5,926,182 | A | * | 7/1999 | Menon et al. .................. | 345/421 |
| 5,945,992 | A | * | 8/1999 | Cunniff ......................... | 715/748 |
| 6,115,038 | A | * | 9/2000 | Christofferson et al. ...... | 715/751 |
| 6,160,557 | A | * | 12/2000 | Narayanaswami ............ | 345/422 |
| 6,377,257 | B1 | * | 4/2002 | Borrel et al. .................. | 345/419 |
| 6,603,474 | B1 | * | 8/2003 | Cobb et al. .................... | 345/421 |
| 7,274,368 | B1 | * | 9/2007 | Keslin ........................... | 345/522 |
| 7,418,606 | B2 | * | 8/2008 | Holmer ......................... | 713/320 |
| 7,768,518 | B2 | | 8/2010 | Collins | |
| 8,035,636 | B1 | | 10/2011 | Yang | |
| 8,319,781 | B2 | * | 11/2012 | Westerhoff et al. ........... | 345/502 |
| 8,386,560 | B2 | * | 2/2013 | Ma et al. ........................ | 709/203 |
| 2001/0031003 | A1 | | 10/2001 | Sawhney et al. | |

(Continued)

OTHER PUBLICATIONS

International Search Report and Written Opinion dated Feb. 2, 2012 for PCT/US2011/052010.

(Continued)

*Primary Examiner* — David Zarka
*Assistant Examiner* — Jason Pringle-Parker

(57) ABSTRACT

An improved approach for a remote graphics rendering system that can utilize both server-side processing and client-side processing for the same display frame. Some techniques for optimizing a set of graphics command data to be sent from the server to the client include: eliminating some or all data, that is not needed by a client GPU to render one or more images, from the set of graphics command data to be transmitted to the client; applying precision changes to the set of graphics command data to be transmitted to the client; and performing one or more data type compression algorithms on the set of graphics command data.

28 Claims, 10 Drawing Sheets

(56) References Cited

U.S. PATENT DOCUMENTS

| | | | |
|---|---|---|---|
| 2003/0218615 A1* | 11/2003 | Gelb | 345/555 |
| 2004/0041810 A1 | 3/2004 | Peacock et al. | |
| 2004/0100466 A1 | 5/2004 | Deering | |
| 2004/0221004 A1* | 11/2004 | Chalfin et al. | 709/203 |
| 2006/0082583 A1 | 4/2006 | Leichtling et al. | |
| 2006/0125848 A1 | 6/2006 | Alcorn et al. | |
| 2007/0024705 A1 | 2/2007 | Richter et al. | |
| 2007/0046966 A1* | 3/2007 | Mussack et al. | 358/1.13 |
| 2007/0115282 A1 | 5/2007 | Turner et al. | |
| 2007/0280290 A1 | 12/2007 | Hindus et al. | |
| 2008/0225048 A1 | 9/2008 | Bijankumar et al. | |
| 2008/0316218 A1* | 12/2008 | Kilani et al. | 345/522 |
| 2009/0033737 A1 | 2/2009 | Goose et al. | |
| 2009/0119736 A1* | 5/2009 | Perlman et al. | 725/133 |
| 2009/0144775 A1 | 6/2009 | Rosin et al. | |
| 2009/0195537 A1 | 8/2009 | Qiu et al. | |
| 2009/0210487 A1 | 8/2009 | Westerhoff et al. | |
| 2010/0011301 A1 | 1/2010 | Binyamin | |
| 2010/0205246 A1 | 8/2010 | Collins | |
| 2010/0262710 A1 | 10/2010 | Khatib et al. | |
| 2011/0122063 A1* | 5/2011 | Perlman et al. | 345/161 |
| 2011/0126255 A1* | 5/2011 | Perlman et al. | 725/116 |

OTHER PUBLICATIONS

International Search Report and Written Opinion dated May 8, 2012 for PCT/US2012/02117.

International Search Report and Written Opinion dated Aug. 10, 2012 for PCT/US2012/041521.

International Search Report and Written Opinion dated Oct. 16, 2012 for PCT/US20121048180.

Non final Office Action dated Sep. 11, 2013 for U.S. Appl. No. 13/558,163, 11 pages.

Final Office Action dated Jan. 2, 2014 for U.S. Appl. No. 13/558,163, 12 pages.

* cited by examiner

METHOD AND MECHANISM FOR DELIVERING APPLICATIONS OVER A WAN

CROSS-REFERENCE TO RELATED APPLICATIONS

The present application claims the benefit of U.S. Provisional Application Ser. No. 61/384,265, filed on Sep. 18, 2010, which is hereby incorporated by reference in its entirety.

FIELD OF THE INVENTION

The invention relates to the field of remote graphics rendering.

BACKGROUND 3D graphics rendering systems, such as gaming PCs and gaming devices follow a standard architecture that typically includes:
1. CPU subsystem—it includes the main processor, memory and storage
2. Graphics subsystem—it includes the graphics processor (GPU) and associated memory.
3. A Display subsystem that is connected to the GPU The CPU subsystem and the GPU subsystem are typically connected through a high speed bus, such as PCI, AGP or PCI-Express. The GPU subsystem is typically connected to the Display through another high speed interface such as HDMI, DVI, or Display Port. The role of these components can be thought of as the CPU being responsible for describing the content at an abstract level and the GPU being responsible for rendering the content in pixel form. The Display is then responsible for visually displaying the pixels to the user.

Typically, the main program generating the graphics, such as a game program, is run on the CPU where the game program listens to user input from keyboard or game pad. The game program executes the game logic and then sends commands to the GPU telling the GPU how to create a picture (also called a frame or image) that will be shown on the Display. This process is repeated several times every second to create an appearance of smooth motion on the Display. Typically it is repeated 30 times a second. This figure is also known as refresh rate.

It is the GPU's job to execute the commands sent by the CPU. Commands can be roughly categorized as "simple commands" that the GPU can execute by itself, "indirect commands" that refer to data residing in the CPU's memory (known as System Memory), or commands that read data generated by the GPU.

Typically the volume of data going from the CPU to GPU, and the system memory to GPU, far outweighs the data going from the GPU to CPU. The performance of the GPU, and therefore the quality of the gaming experience, is directly proportional to the number of frames the GPU can process per second. Thus, the data transfer bandwidth between the CPU/System Memory and the GPU plays a crucial role in this performance. If the interface between the CPU and GPU is constrained, this data transfer can be a bottleneck that will hurt performance. The pace of innovation in this interface (ISA, PCI, AGP, PCIE 1.0, PCIE 2.0, PCIE 3.0) has been brisk. A typical gaming system today has bandwidth of up to 4 Gbytes/Second.

The nature of the CPU-GPU and the GPU-Display interface has required that the CPU, GPU and Display be part of the same system to guarantee the best performance. This limitation has implications for system design, such as power consumption, size, portability, cooling requirements and noise. For these and other reasons, there is interest in the graphics community to find ways to physically separate the CPU, GPU and Display, in a way that does not require re-writing of applications. Possible solutions range from physical separation at the electrical level, to software solutions that operate at higher levels.

An example solution involves housing the GPU in a separate chassis from the CPU, while continuing to use the PCIE interface to form a connection between the CPU and GPU. This allows the GPU to be scaled independently of the CPU. The drawback, however, is that the electrical requirements of this interface are such that the cable that connects the CPU to GPU cannot be longer than a few feet.

Another possible solution works as follows. In this approach, a portion of the graphics processing takes place at a server system and the remainder of the processing takes place at a client system. A server thin software layer accesses a server GPU's Frame Buffer (the memory where the pixels reside). The pixels in the server GPU's Frame Buffer are then compressed and sent to the client system. The compression is typically lossy because the bandwidth requirement for lossless compression is too high. At the client system, a client piece of software puts the pixels in the client GPU Frame Buffer. The client Display then displays these pixels. This approach is known as Frame Buffer Remoting. The obvious disadvantage of this approach is the loss of visual quality that results from lossy compression.

Yet another solution exists, that delivers better visual fidelity than Frame Buffer Remoting. In this approach, a portion of the graphics processing again takes place at a server system and the remainder of the processing again takes place at a client system. A server thin software layer intercepts graphics commands that go from the server CPU to the server GPU. The graphics command stream is optionally compressed. The compressed graphics commands are sent over an IP network to the client system. A client software layer retrieves the compressed graphics commands and sends them to a client GPU. The client GPU then executes these commands and displays the picture on a client display. One disadvantage of this approach is that the bandwidth requirement can become very high because the data transfer rate requirement from the server to the client is very high. Another drawback of this approach is that the client CPU is mostly wasted, because the server CPU is doing most of the work.

When looking at these approaches, it becomes obvious that it is not possible for these approaches to satisfy both visual quality and low bandwidth constraints simultaneously. That makes it infeasible to deploy these approaches for demanding applications such as games, especially on today's broadband networks where the bandwidth is limited. Even where it is possible to deploy such approaches without bandwidth constraints, such approaches will result in wasting the CPU capacity of the client system.

SUMMARY

Some embodiments of the present invention provide an improved approach for a remote graphics rendering system that can utilize both server-side processing and client-side processing for the same display frame. In this way, optimal balancing of the CPU and GPU capacity may be achieved such that CPU capacity is not wasted in a client device.

Some embodiments of the present invention describe techniques for optimizing a set of graphics command data to be sent from the server to the client. In some embodiments, techniques for eliminating some or all data, that is not needed by a client GPU to render one or more images, from the set of graphics command data to be transmitted to the client are described. In some embodiments, techniques for applying precision changes to a set of graphics command data to be transmitted to the client are described. In some embodiments, techniques for performing one or more data type compression algorithms on the set of graphics command data are described.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Some embodiments of the present invention are directed to an improved approach for implementing a remote graphics rendering system that can utilize both server-side processing and client-side processing for the same display frame. Some embodiments of the present invention describe techniques for optimizing a set of graphics command data to be sent from the server to the client. Some embodiments of the present invention describe techniques for optimizing a set of graphics command data for a single frame. While the following embodiments may be applied to any visual computing program that uses a GPU for rendering images, for the purpose of illustration, the remainder of this discussion will be presented in the context of 3-D games.

Figure 1:
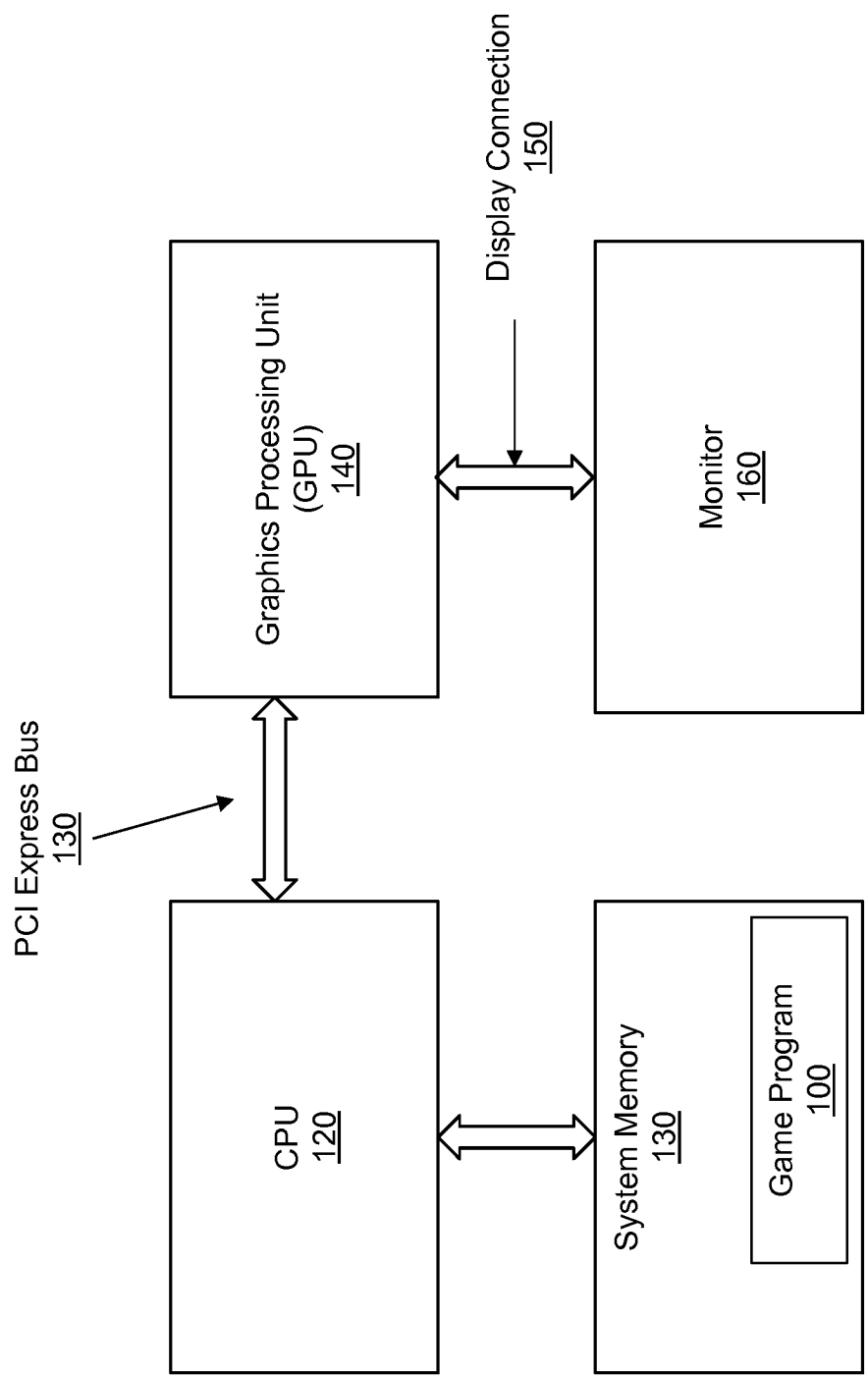
FIG. 1 illustrates a block diagram of a traditional gaming system.

FIG. 1 illustrates a block diagram of an example gaming system. A game program 100 resides in a system memory 110, which is attached to a CPU 120. The CPU 120 fetches instructions from the system memory 110 and executes those instructions. The CPU 120 is further connected to a GPU 140 over a high speed PCI Express bus 130. As a result of the instruction execution, the CPU 120 sends graphics commands to the GPU 140 over the PCI Express bus 130.

The GPU 140 then executes those graphics commands. The GPU 140 may need access to some of the system memory 110 contents in order to execute some or all of the graphics commands. In that case, the GPU 140 fetches the contents from system memory 110. The GPU 140 is connected to the monitor 160 using a Display connection 150 such as VGA, HDMI or DisplayPort. When the graphics command execution completes, the GPU 140 sends the resulting pixels to a monitor 160 using a connection 150. The process of displaying pixels is repeated many times a second. The rate at which this happens is known as the Frame Rate or the Frames per Second (FPS). User experience begins to deteriorate as the FPS decreases.

A user of the gaming system may give inputs to the game program 100 by way of input devices 170 such as a keyboard, mouse or game pad connected to the gaming system. The game program 100 modifies the graphics command stream in response to the user input. The image displayed on the monitor 160 changes accordingly. This process typically happens very fast, normally taking no more than 100 milliseconds for a given input.

Figure 2:
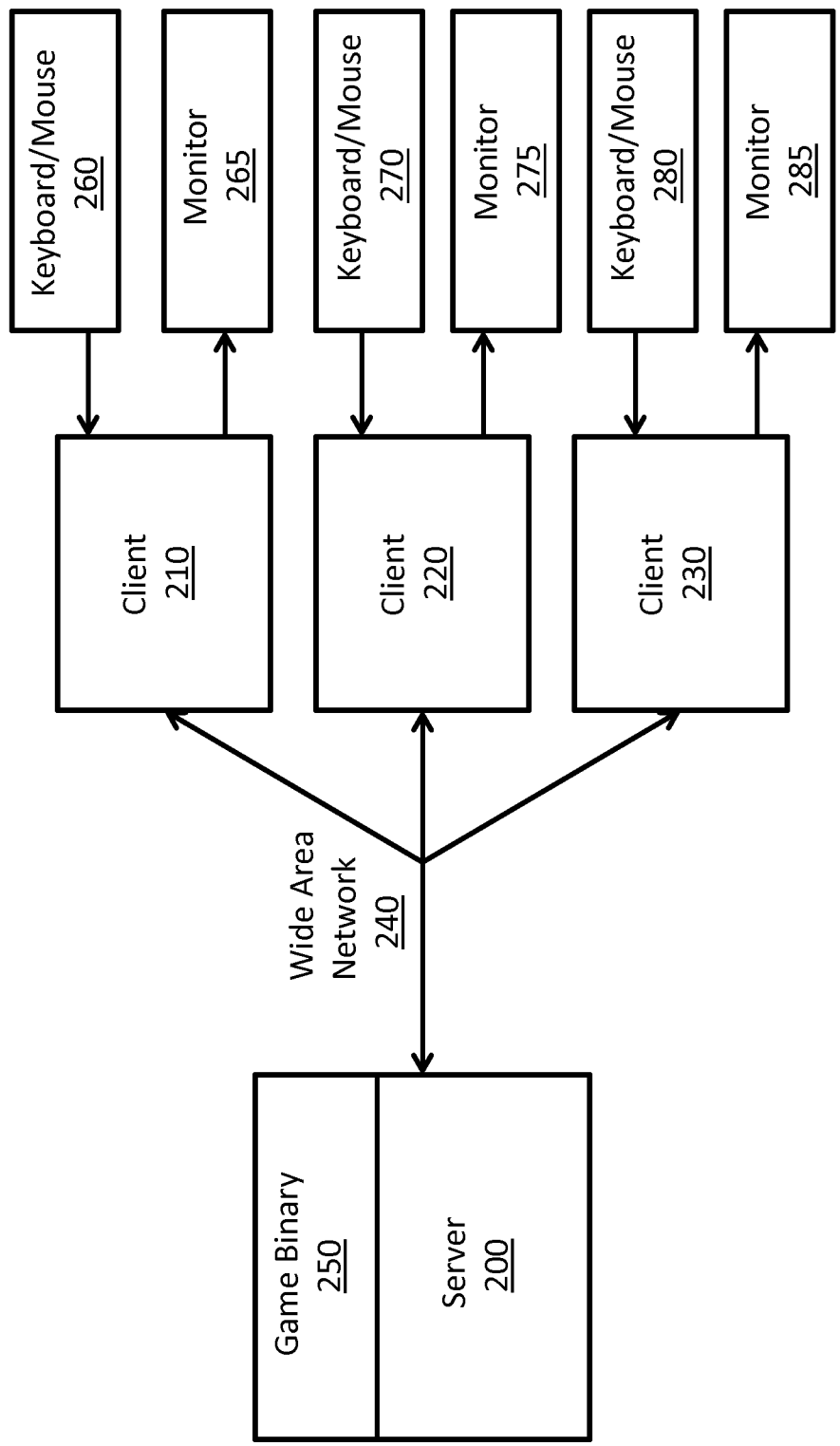
FIG. 2 illustrates a block diagram of an alternative client-server based gaming system architecture.

While the traditional architecture gaming system has worked well for a long time, technological advances have made possible an alternative architecture that offers additional benefits. This new architecture is illustrated in FIG. 2, where there are multiple clients 210, 220, 230 connected to a server 200 over a Wide Area Network 240. The server 100 and client devices 210, 220, 230 may all be in different geographical locations. The game binary (e.g., game program) 250 resides on the server 200. The clients 210, 220, 230 each have an input device 260, 270, 280 and monitor 265, 275, 285. Although the game is running on the server, users are seeing the images on their corresponding client and interacting with the game using the input device connected to their corresponding client.

Figure 3:
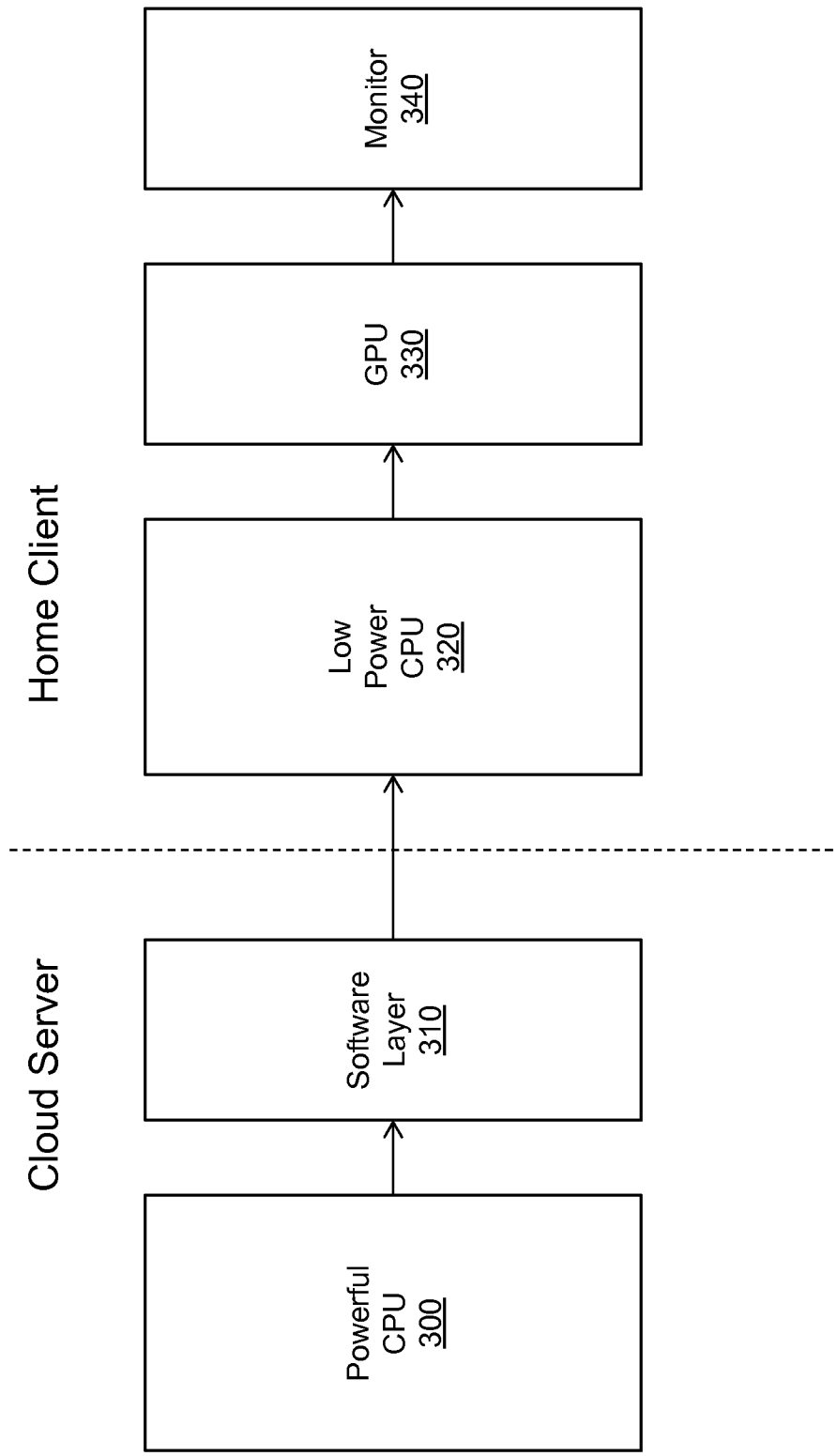
FIG. 3 illustrates a block diagram of an embodiment of the alternative architecture in FIG. 2.

FIG. 3 shows an embodiment of this architectural innovation. A powerful CPU 300 is located in the cloud data center. The powerful CPU 300 generates graphics command data for the GPU (not shown) that are intercepted by software layer 310 and compressed. The compressed graphics command data is then sent over a network to the CPU 320 in the client. The client CPU 320 can be a low power CPU because the amount of work it has to do is limited, as the application is running on the cloud CPU 300. The client CPU 320 is further connected to the client GPU 330. The client GPU 330 creates an image for display on the client monitor 340.

The CPU, software layer, and GPU in the cloud server may also be referred to as the server CPU, server software layer, and server GPU respectively. Similarly, the CPU, GPU, and monitor in the client may be referred to as the client CPU, client GPU, and client monitor respectively.

By effectively separating the CPU and GPU, this architecture offers the following benefits:

1. Cost of the client system can be significantly reduced, because it does not need require a powerful CPU subsystem.
2. No loss in visual quality of images during transmission from the server to the client, because the image is created by the client GPU rather than the server GPU.
3. The server CPU is no longer bound by the client's size and power budget. It can be scaled independently.

Several techniques exist for optimizing the set of graphics command data being sent from the server CPU to the client CPU/GPU. These techniques may include: eliminating some or all data, that is not needed by a client GPU to render one or more images, from the set of graphics command data; applying precision changes to the set of graphics command data;

and performing one or more data type compression algorithms on the set of graphics command data. The technique of eliminating some or all data, that is not needed by a client GPU to render one or more images, from the set of graphics command data may also be referred to herein as eliminating unnecessary information. The technique of applying precision changes to the set of graphics command data may also be referred to herein as applying dynamic precision changes. The technique of performing one or more data type compression algorithms on the set of graphics command data may also be referred to herein as performing custom compression algorithms. Each of these techniques will be discussed in detail below.

In some embodiments, optimization for the set of graphics command data may be implemented for a single display frame. In other embodiments, optimization for the set of graphics command data may be implemented for more than one display frame.

Eliminating Unnecessary Information

In the architecture outlined in FIG. 1, there is a well-defined distribution of work between the CPU and the GPU. The CPU creates a model of a 3D world. The GPU then translates the model into pixels that can be displayed on the monitor. This 3-D world may be made from graphics primitives such as triangles. When the CPU communicates with the GPU, it does not know how much of the information being sent to the GPU is useful in creating the final frame. The GPU consumes the information sent by the CPU, discards the unnecessary information, and uses the remaining information to create the final image.

The information being communicated between the CPU and the GPU may be graphics command data. Such graphics command data allows the GPU to render pixels in accordance with the 3-D world for display.

Figure 4:
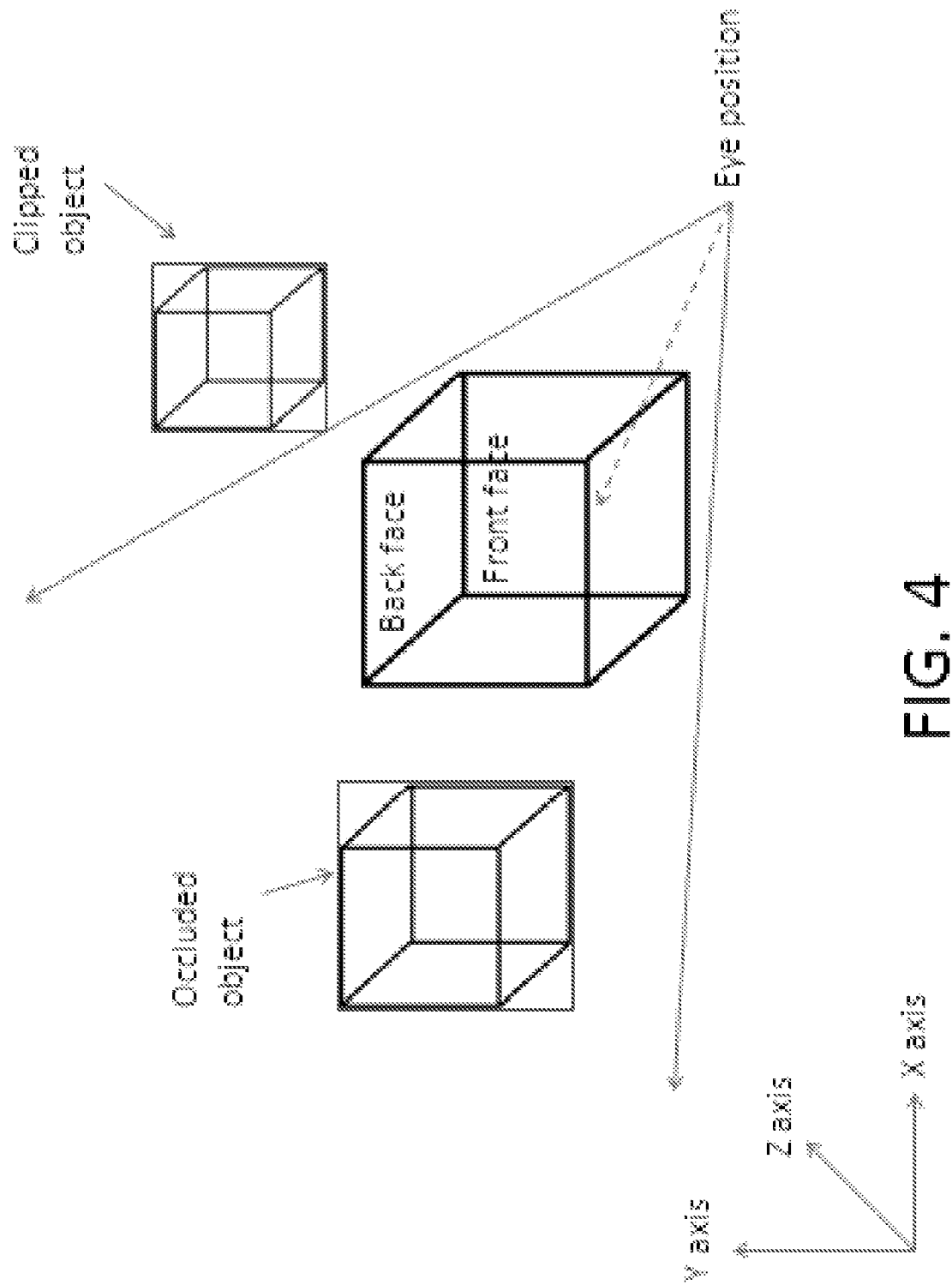
FIG. 4 illustrates examples of unnecessary graphics command data.

The obvious disadvantage here is that the CPU is sending more information than necessary to the GPU. The key insight behind this invention is that by utilizing slightly more CPU computational power, it is possible locate and discard this unnecessary information. There is no reason to do this in the traditional architecture, since the GPU is better suited for this job when compared to the CPU. However, by exploiting this insight in the new architecture (e.g., system depicted in FIG. 3) and having the server CPU discard this information, we manage to reduce the data transfer from the server CPU to the client GPU A 3-D world corresponding to a game program is composed of graphics primitives such as triangles. When a CPU transmits graphics command data to a GPU, information associated with such primitives is transmitted as part of the graphics command data. However, the GPU may not use all of the information associated with primitives when rendering pixels for the 3-D world. Some examples of when primitive information can be discarded by the CPU include:
1. A primitive is facing away from the camera, i.e. it is back-facing.
2. A primitive is occluded (covered) by another primitive that's in front of it, so it can't be seen by the camera.
3. A primitive falls outside the view frustum of the camera
4. Vertex information for a primitive is being sent, but the primitive is never rendered
5. An entire render target (i.e., plurality of primitives) is not changing FIG. 4 illustrates 3 of these cases. FIG. 4 provides examples where information associated with a primitive is not needed in the graphics command data to accurately render an image. FIG. 4 illustrates an object (i.e., one or more primitives) with a primitive that is facing away from the camera. Information associated with the back-facing primitive may be eliminated from the graphics command data without affecting the accurateness of the 3-D world. FIG. 4 also illustrates an occluded object (i.e., one or more primitives) that is not within a user's view when interacting with the 3-D world. Information associated with such an object may be eliminated from the graphics command data without affecting the accurateness of the 3-D world. FIG. 4 additionally illustrates an object (i.e., one or more primitives) that falls outside the view frustum of a camera associated with the 3-D world. Information associated with such an object may be eliminated from the graphics command data without affecting the accurateness of the 3-D world.

Figure 5:
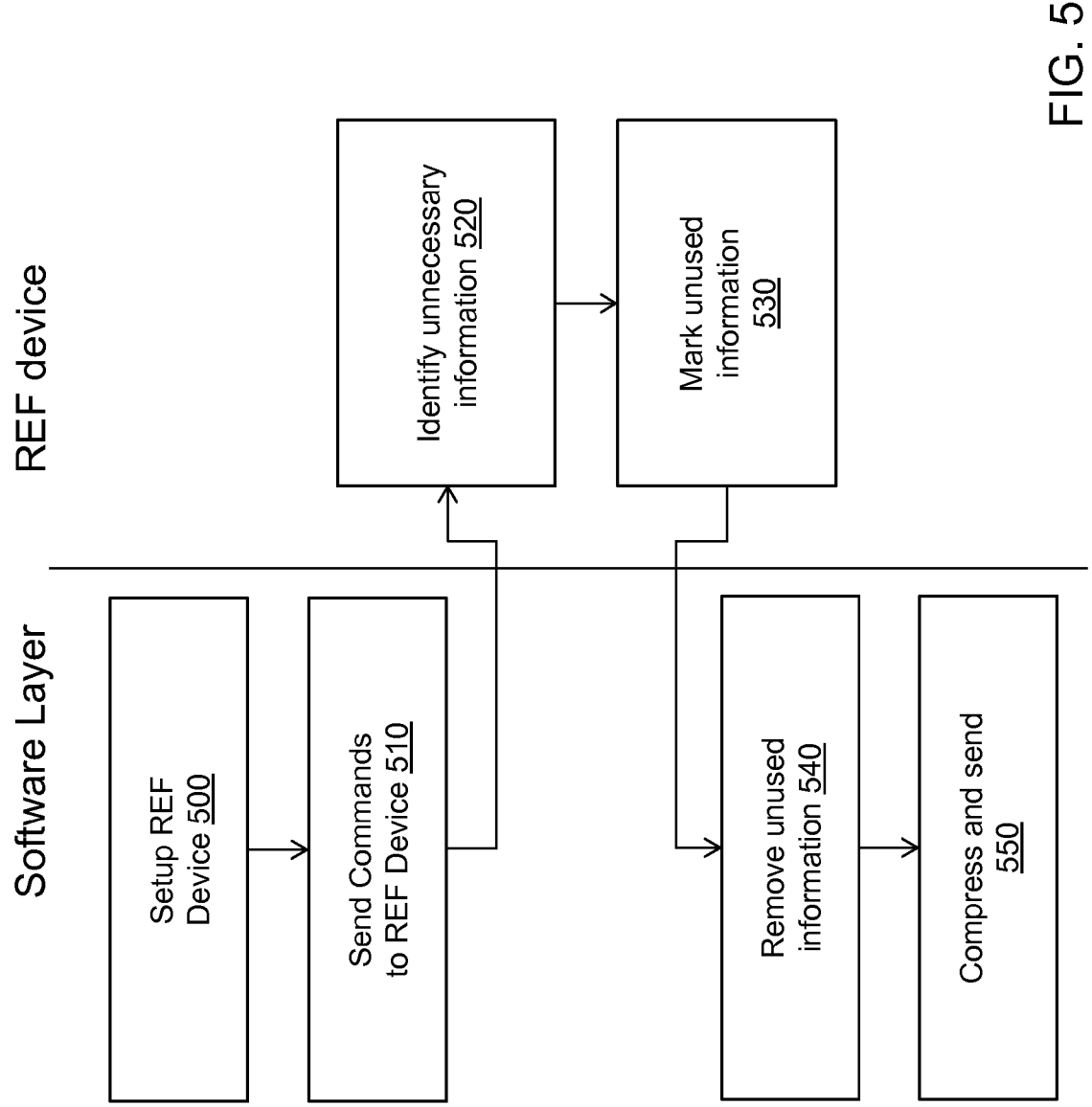
FIG. 5 illustrates a flowchart of an example approach for eliminating some or all data, that is not needed by a client GPU to render one or more images, from the set of graphics command data.

There are several ways of implementing this kind of processing on the server side. One implementation is illustrated in the FIG. 5. FIG. 5 illustrates a flowchart of an example approach for eliminating some or all data, that is not needed by a client GPU to render one or more images, from the set of graphics command data.

The process begins by opening a software based "Reference" device on the server CPU as shown in step 500. This "Reference" device is set up exactly as a hardware GPU device. In the next step 510, the graphics command data coming from the application are sent to this "Reference" device. In the next step 520, the "Reference" device performs steps to identify unnecessary information including but not limited to clipped objects, back facing primitives and occluded objects. The "Reference" device then marks unnecessary information as shown in step 530. It can do so using a custom shader program, for example. In step 540, the software layer removes the unnecessary information and in step 550, the software layer sends the command stream to the client.

This approach for eliminating unnecessary information takes place in the server. The "Reference" device mimics a hardware GPU that runs on a client. The unnecessary information being eliminated may be some or all data, that is not needed by a client GPU to render one or more images, from the set of graphics command data to be transmitted to the client.

The framework described in this implementation can be used in other ways. An example is to have a client device report to the server software layer whenever a specific render target (e.g., plurality of primitives) is unchanged. Based on the rate of change of render target content, the server software layer may choose to not send the render target information every frame. In this example, the unnecessary information being eliminated may be graphics command data corresponding to information associated with a render target that need not be sent every frame.

An obvious benefit of this invention is that the client GPU does not have to process any unnecessary information. This results in improved performance and power consumption in the client GPU. An additional benefit results from decreased bandwidth consumption when transmitting graphics command data from the server to the client.

In some embodiments, the technique of eliminating unnecessary information for a set of graphics command data may be applied to a set of graphics command data corresponding to a single display frame. In other embodiments, the technique of eliminating unnecessary information for a set of graphics command data may be applied to a set of graphics command data corresponding to more than one display frame.

Applying Dynamic Precision Changes

Another technique for optimizing the set of graphics command data being sent from the server to the client involves performance of dynamic precision changes to the graphics command data. In any gaming system, the CPU sends several different kinds of data to the GPU. Some kinds of data may include vertex data, index data, and texture data. The precision for these data types are typically statically determined in the beginning. This determination is made based on a worst case requirement of the game graphics. The data transfer bandwidth grows in proportion to precision requirement.

The key insight of this invention is that the precision requirement is not static. The precision requirement may depend upon what is happening within the game. For example, consider an object that is close to the user's eye. Such an object can occupy a large part of the screen and details of the object will be visible to the user. The game may change, such as when the camera moves far from the object. In this case the object becomes smaller and smaller in size and several details of the object get blurred.

When an object occupies a large portion of the screen the precision requirements may be increased for the object to improve the visual quality of the image perceived by the user. When the object becomes smaller, the precision requirements of the object may be decreased without hindering the visual quality of the image perceived by the user.

The CPU, however, is typically not equipped to know in advance which details become unimportant as the game set up changes. The invention allows dynamic change to the precision based on analysis of the graphics command data. The list below includes some of the places where precision can be changed dynamically.

1. Vertex attribute precision can be reduced
2. Texture image precision can be reduced
3. Object mesh precision can be reduced (by algorithms such as Progressive Mesh).

Various methods can be employed to make a decision about precision reduction. An example heuristic follows. The key parameter is to evaluate the ratio of an object's screen area and the amount of data being sent to create that object. A threshold can be determined by empirical analysis. If the object falls above this threshold, i.e., if there is too much data being sent for a given screen size, then the precision of vertex and mesh can be reduced by a fixed amount. A similar threshold can be applied to a textured object. If the textured object is showing a rapidly changing texture, video compression can be used to optimize the bandwidth requirement of texture image transfer from CPU to GPU.

Figure 6:
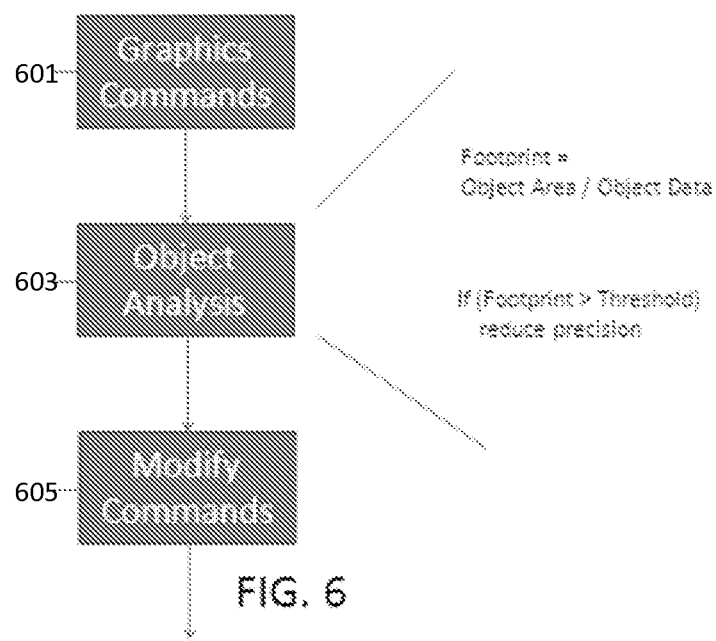
FIG. 6 illustrates a flowchart of an example approach for applying precision changes to a set of graphics command data being transmitted to the client.

FIG. 6 shows a practical implementation of this technique. FIG. 6 illustrates a flowchart of an example approach for applying precision changes to a set of graphics command data being transmitted to the client. A set of graphics command data may be generated by a server as shown in step 601. The graphics command data may then undergo object analysis to determine whether a precision change should be applied to objects associated with the graphics command data as shown in step 603. Determining when to apply a precision change for a given object is involves determining the object footprint (the ratio of the object's screen area to an amount of data being sent to create that object). A threshold value can be determined by empirical analysis. If the object footprint falls above this threshold, i.e. if there is too much data being sent for a given screen size, then the precision of vertex attribute and object mesh may be reduced by a fixed amount. A similar threshold evaluation can also be applied to a textured object in order to determine appropriate dynamic precision changes to be made to the texture data. After object analysis has been performed on the graphics command data, the graphics command data is modified in accordance with the object analysis as shown in step 605. Such modification may include any of the precision reduction techniques discussed above (e.g., vertex attribute precision reduction, texture image precision reduction, object mesh precision reduction)

In some embodiments, the graphics command data may be received by and undergo object analysis by a "Reference" device similar to the one discussed above with respect to FIG. 5. In some embodiments, the "Reference" device may implement the precision change technique concurrently with the elimination of unnecessary information. Alternatively, in some embodiments, the "Reference" device may implement the precision change technique separately from the elimination of unnecessary information.

In some embodiments, the technique of applying dynamic precision changes for a set of graphics command data may be applied to a set of graphics command data corresponding to a single display frame. In other embodiments, the technique of applying dynamic precision changes for a set of graphics command data may be applied to a set of graphics command data corresponding to more than one display frame.

Performing Custom Compression Algorithms

Another technique for optimizing the set of graphics command data being sent from the server to the client involves applying data type compression algorithms (e.g., custom compression algorithms) to the graphics command data. The graphics command data going from CPU to GPU consists of various kinds of data as mentioned above. Such data may include vertex data, index data, texture data, and API calls.

Some of this data can tolerate lossy compression, and some cannot. For example, lossy compression of API calls will result in wrong function calls being made, that will result in incorrect operation. However, loss of precision in vertex data is tolerable up to a limit.

Even for a particular data type inside a data stream such as vertex data, the various quantities being sent have their own characteristics. For example, the position data associated with a vertex is typically generated algorithmically by the game. Understanding the structure of the algorithm that generates this data can help us compress it better. Consider a solid object composed of many vertices moving through space. The position of each vertex is evaluated by multiplying the original vertex position by a transform matrix. The position for each vertex changes from frame to frame. If we were to compress each vertex individually, the bandwidth requirement would scale in proportion to the number of vertices. But by knowing the transform matrix, the vertex position can be recreated on the client side CPU without having to compress each vertex individually.

This key insight here is that by understanding the constraints and properties for each data type generated by the CPU, we can use various algorithms for compressing that data effectively.

Figure 7:
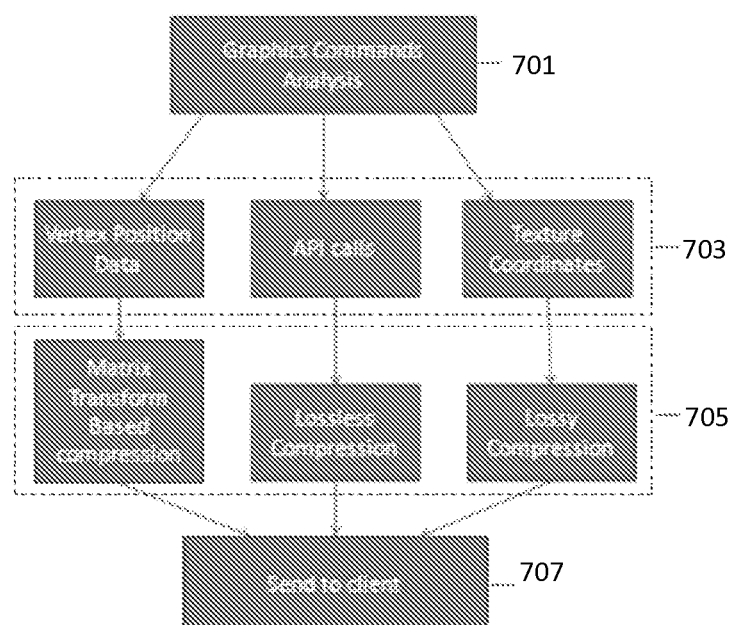
FIG. 7 illustrates a flowchart of an example approach for performing one or more data type compression algorithms on a set of graphics command data.

FIG. 7 illustrates an example implementation. FIG. 7 illustrates a flowchart of an example approach for performing one or more data type compression algorithms on a set of graphics command data. At step 701, the graphics command data is analyzed. The data is then separated into various streams, such as Vertex Position, API calls, and Texture coordinates as shown in step 703. Custom compression algorithms may then be performed on the various data types of the graphics command data as shown in step 705. For example, vertex position data can be compressed by working out the transform matrix. API calls may be compressed losslessly. Texture coordinates may be compressed with a lossy algorithm that can tolerate small changes. The compressed graphics command data may then be reassembled and sent to the client as shown in step 707.

In some embodiments, the technique of performing data type compression algorithms for a set of graphics command data may be applied to a set of graphics command data corresponding to a single display frame. In other embodiments, the technique of performing data type compression algorithms for a set of graphics command data may be applied to a set of graphics command data corresponding to more than one display frame.

Figure 8:
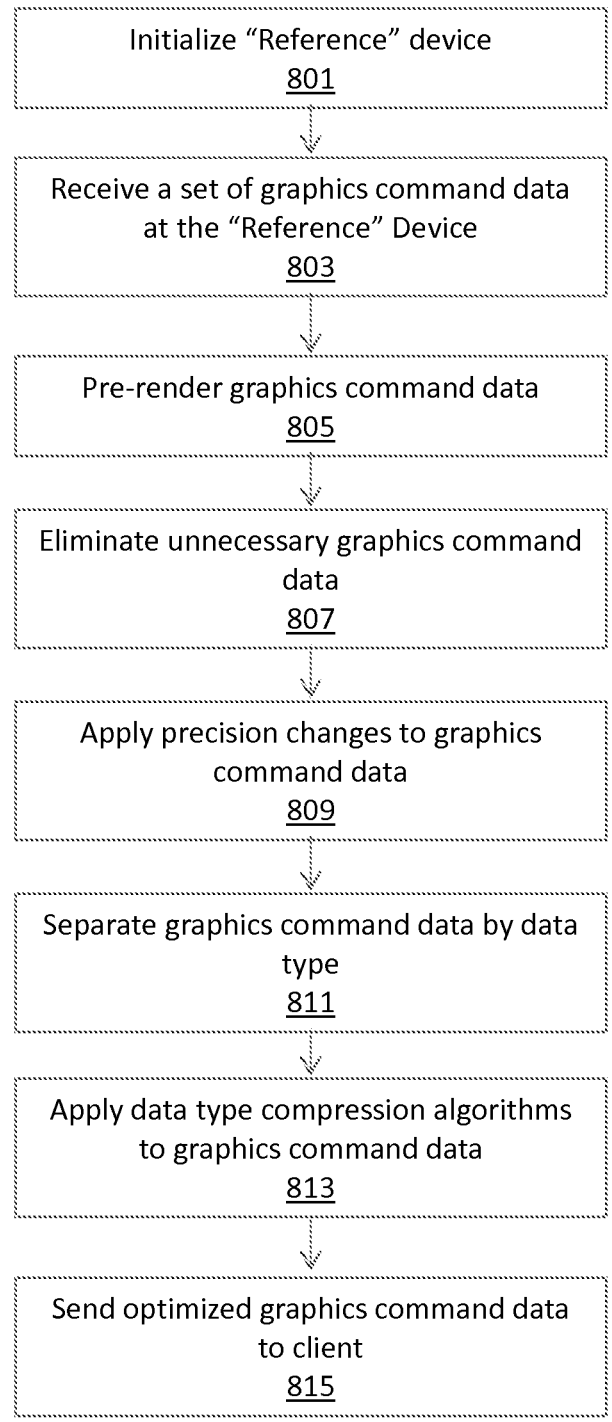
FIG. 8 illustrates a flowchart of an example approach for implementing remote graphics rendering at a server.

Various combinations of the three techniques for optimizing the compressed graphics command data being sent from the server to the client discussed above may be applied to any set of graphics command data. FIG. 8 illustrates a flowchart of an example approach for implementing remote graphics rendering at a server. A "reference" device as discussed above may be initialized in the server as shown in step 801. A set of graphics command data generated by a server CPU may then be received by the "reference" device for processing as shown in step 803. The set of graphics command data may then be pre-rendered by the "reference" device as shown in step 805. Some or all data, that is not needed by a client GPU to render one or more images, may be eliminated from the set of graphics command data to be transmitted to the client by the server CPU using information obtained from pre-rendering the graphics command data as shown in step 807. Additionally, precision changes may be applied to the set of graphics command data by the server CPU also using information obtained from pre-rendering the set of graphics command data as shown in step 809. The set of graphics command data may then be separated by data type using the server CPU as shown in step 811. Data type compression algorithms may then be applied to the set of graphics command data as shown in step 813. Finally the optimized graphics command data may be sent to the client as shown in step 815.

While the above example uses a "reference device" to pre-render graphics command data in order to derive information that may be used to eliminate some or all data, that is not needed by a client GPU to render one or more images, from the set of graphics command data to be transmitted to the client and to apply precision changes to the set of graphics command data, one ordinarily skilled in the art will understand that there are various other ways to derive information that may be used to eliminate some or all data, that is not needed by a client GPU to render one or more images, from the set of graphics command data to be transmitted to the client or used to apply precision changes to the set of graphics command data.

Figure 9:
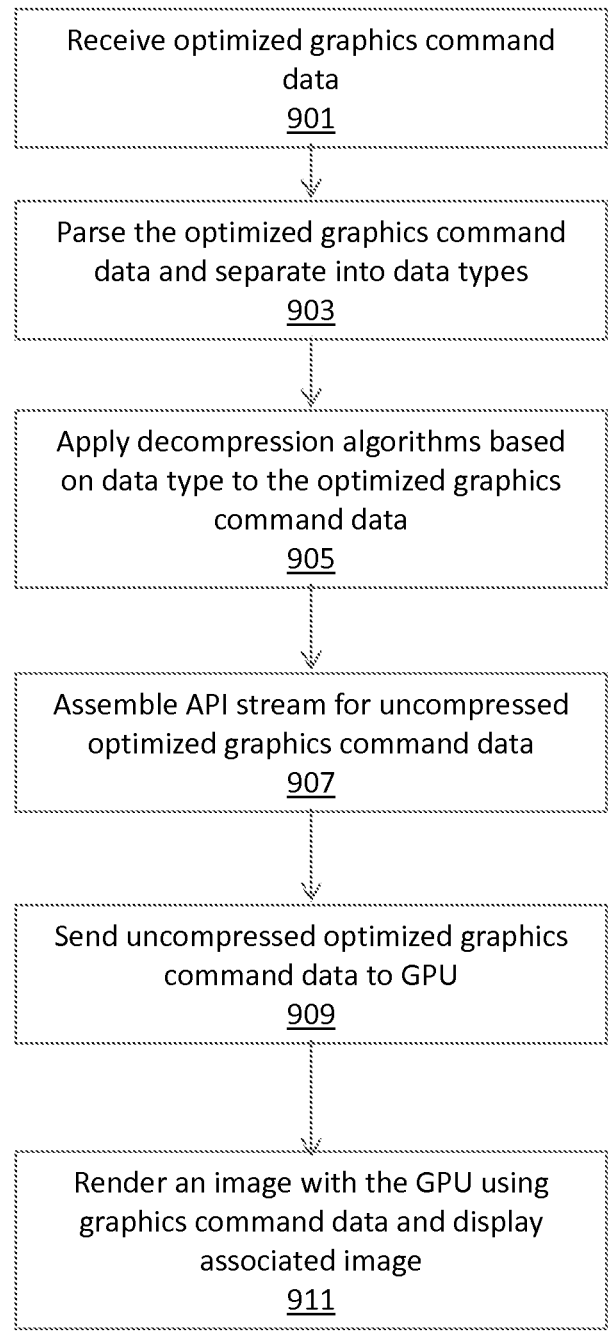
FIG. 9 illustrates a flowchart of an example approach for implementing remote graphics rendering at a client.

Once a client has received a set of optimized graphics command data, it may perform a series of steps to transform the optimized graphics command data into an image to be perceived by a user of the client. FIG. 9 illustrates a flowchart of an example approach for implementing remote graphics rendering at a client. Initially, the set optimized graphics command data is received by the client CPU as shown in step 901. The client CPU then parses the set of optimized graphics command data to separate the optimized graphics command data into data types as shown in step 903. The client CPU then applies one or more decompression algorithms based at least in part on data type to the received set of optimized graphics command data to form a set of uncompressed optimized graphics command data as shown in step 905. Once decompression is completed, the client CPU assembles API streams for the uncompressed optimized graphics command data as shown in step 907 and sends the uncompressed optimized graphics command data to the client GPU as shown in step 909. The client GPU may then render an image using the graphics command data and display the associated image to the user as shown in step 911.

System Architecture Overview

Figure 10:
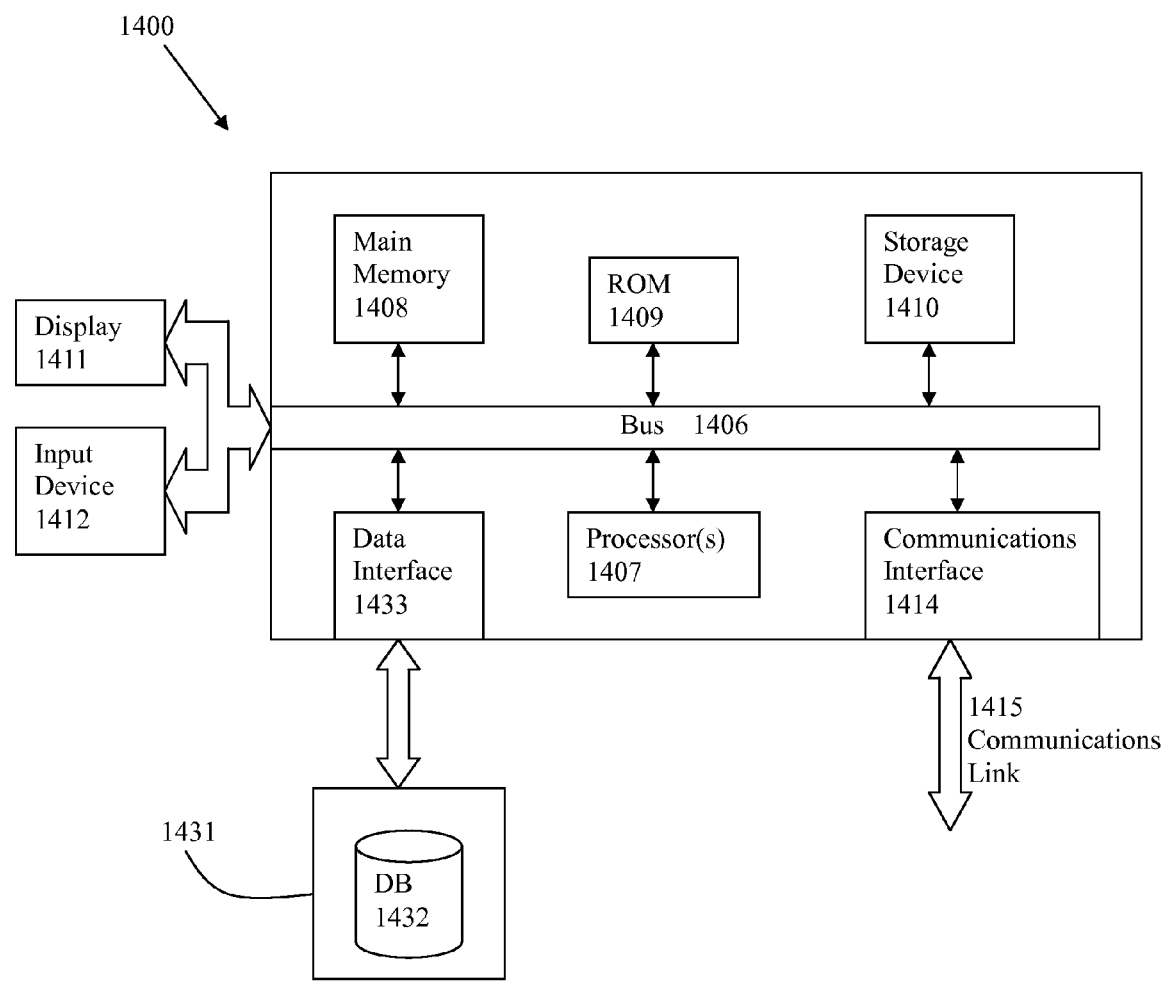
FIG. 10 depicts a computerized system on which a method for implementing remote graphics rendering may be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1408 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to process 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing remote graphics rendering, comprising:
   a) generating, at a server CPU, a set of graphics commands to be transmitted from a server to a client, wherein the set of graphics commands are commands to be executed by a client GPU to generate pixels for display;
   b) optimizing the set of graphics commands at the server CPU by:
   1) eliminating some or all primitive data, that need not be executed by the client GPU to generate pixels for rendering one or more images, from the set of graphics commands to be transmitted to the client;
   2) applying precision changes to the set of graphics commands to be transmitted to the client; and
   3) performing one or more data type compression algorithms on the set of graphics commands, including:
   i) separating the set of graphics commands into a plurality of data streams based on individual data types, the individual data types comprising vertex position data, API calls, and texture coordinate data; and
   ii) performing a different customized compression algorithm on each of the plurality of data streams to generate a corresponding plurality of compressed data streams representing the set of graphics commands; and
   c) transmitting the plurality of compressed data streams representing the optimized set of graphics commands to the client, wherein the plurality of compressed data streams representing the optimized set of graphics commands is executed by the client GPU to render the one or more images.

2. The computer implemented method of claim 1, wherein eliminating some or all primitive data that does not need to be executed by the client GPU to generate pixels for rendering the one or more images comprises:
   identifying data to be eliminated from the set of graphics commands to be sent to the client device;
   marking the data to be eliminated in the set of graphics commands to be sent to the client device;
   removing the data to be eliminated from the set of graphics commands to be sent to the client device.

3. The computer implemented method of claim 2, wherein identifying data to be eliminated comprises identifying a primitive that is facing away from a camera.

4. The computer implemented method of claim 2, wherein identifying data to be eliminated comprises identifying a primitive that is occluded from a camera.

5. The computer implemented method of claim 2, wherein identifying data to be eliminated comprises identifying a primitive that falls outside of a view frustum of a camera.

6. The computer implemented method of claim 2, wherein identifying data to be eliminated comprises identifying vertex information for a primitive that is to be sent to the client device but never rendered.

7. The computer implemented method of claim 2, wherein identifying data to be eliminated comprises identifying an entire render target that is not changing.

8. The computer implemented method of claim 1, wherein applying precision changes to the set of graphics commands comprises:
   evaluating an object associated with the set of graphics commands to determine a ratio between a screen area of the object and an amount of data in the set of graphics commands used to create the object;
   comparing the ratio to a threshold value; and
   reducing a precision requirement for the object if the ratio is above the threshold value.

9. The computer implemented method of claim 8, wherein reducing a precision requirement for the object comprises reducing vertex attribute precision.

10. The computer implemented method of claim 8, wherein reducing a precision requirement for the object comprises reducing texture image precision.

11. The computer implemented method of claim 8, wherein reducing a precision requirement for the object comprises reducing object mesh precision.

12. The method of claim 1, wherein performing a different customized compression algorithm on each of the plurality of data streams comprises performing lossless compression on API calls.

13. The method of claim 1, wherein performing a different customized compression algorithm on each of the plurality of data streams comprises performing lossy compression on texture coordinate data.

14. The method of claim 1, wherein performing a different customized compression algorithm on each of the plurality of data streams comprises performing transform matrix based compression on vertex position data.

15. The computer implemented method of claim 1, wherein the method further comprises:
   initializing a reference device; and
   generating a reference image based on the set of graphics commands at the server CPU using the reference device to derive information to be used by the server CPU for:
   eliminating primitive data, that does not need to be executed by the client GPU to render the one or more images, from the set of graphics commands; or
   applying precision changes to the set of graphics commands.

16. The computer implemented method of claim 1, wherein the set of graphics commands corresponds to a single display frame.

17. A computer implemented method for implementing remote graphics rendering, comprising:
   a) receiving, at a client, a set of optimized graphics commands from a server, the set of optimized graphics commands including a plurality of compressed data streams corresponding to individual data types, the individual data types comprising vertex position data, API calls, and texture coordinate data, wherein the set of optimized graphics commands is executed by a client GPU at the client to generate pixels for rendering one or more images;
   b) parsing the received set of optimized graphics commands to separate the set of optimized graphics commands into the individual data types; and
   c) applying a decompression algorithms based at least in part on data type to each of the plurality of data streams representing the set of optimized graphics commands to form a set of uncompressed optimized graphics commands; and
   d) assembling API streams for the uncompressed optimized graphics commands.

18. The computer implemented method of claim 17, further comprising:
   sending the uncompressed optimized graphics commands to the client GPU;
   processing the uncompressed optimized graphics commands with the client GPU; and
   displaying an image associated with the uncompressed optimized graphics commands.

19. The computer implemented method of claim 17, wherein the set of graphics commands corresponds to a single display frame.

20. A remote graphics rendering system, comprising:
a server comprising a server CPU, wherein the server is configured to perform a method for implementing remote graphics rendering, comprising:
a) generating, at the server CPU, a set of graphics commands to be transmitted from the server to a client, wherein the set of graphics commands are commands to be executed by a GPU to generate pixels for display;
b) optimizing the set of graphics commands at the server CPU by:
1) eliminating some or all primitive data, that does not need to be executed by a client GPU to generate pixels for rendering one or more images, from the set of graphics commands to be transmitted to the client;
2) applying precision changes to the set of graphics commands to be transmitted to the client; and
3) performing one or more data type compression algorithms on the set of graphics commands, including performing a different customized compression algorithm on each of a plurality of individual data streams of the set of graphics commands, the plurality of individual data streams comprising vertex position data, API calls, and texture coordinate data, to generate a plurality of compressed data streams representing the set of graphics commands; and
c) transmitting the plurality of compressed data streams representing the optimized set of graphics commands to the client, wherein the optimized set of graphics commands is executed by the client GPU to generate pixels for rendering the one or more images.

21. The remote graphics rendering system of claim 20, wherein eliminating some or all primitive data that does not need to be executed by the client GPU to generate pixels for rendering the one or more images comprises:
identifying data to be eliminated from the set of graphics commands to be sent to the client device;
marking the data to be eliminated in the set of graphics commands to be sent to the client device;
removing the data to be eliminated from the set of graphics commands to be sent to the client device.

22. The remote graphics rendering system of claim 20, wherein applying precision changes to the set of graphics commands comprises:
evaluating an object associated with the set of graphics commands to determine a ratio between a screen area of the object and an amount of data in the set of graphics commands used to create the object;
comparing the ratio to a threshold value; and
reducing a precision requirement for the object if the ratio is above the threshold value.

23. The remote graphics rendering system of claim 20, wherein the server further comprises a server software layer connected to the server CPU, the server software layer being configured to facilitate optimizing the set of graphics commands at the server CPU.

24. The remote graphics rendering system of claim 23, wherein the server software layer facilitates optimizing the set of graphics commands data by:
initializing a reference device; and
generating a reference image based on the set of graphics commands using the reference device to derive information to be used by the server CPU for:
eliminating some or all primitive data, that does not need to be executed by the client GPU to render the one or more images, from the set of graphics commands; or
applying precision changes to the set of graphics commands.

25. A remote graphics rendering system, comprising:
a client, comprising:
a client CPU; and
a client GPU, wherein the client is configured to perform a method for implementing remote graphics rendering, comprising:
a) receiving a set of optimized graphics commands from a server, wherein the set of optimized graphics commands includes a plurality of data streams based on data types, the plurality of data streams comprising vertex position data, API calls, and texture coordinate data, the plurality of data streams to be executed by the client GPU at the client to generate pixels for rendering one or more images;
b) parsing the received set of optimized graphics commands using the client CPU to separate the set of optimized graphics commands into the plurality of data streams based on data types; and
c) applying one or more decompression algorithms based at least in part on data type to the plurality of data streams representing the set of optimized graphics commands using the client CPU to form a set of uncompressed optimized graphics commands; and
d) assembling API streams for the uncompressed optimized graphics commands data using the client CPU.

26. The remote graphics rendering system of claim 25, wherein the method for implementing remote graphics rendering, further comprises:
sending the uncompressed optimized graphics commands to the client GPU;
processing the uncompressed optimized graphics commands with the client GPU; and
displaying an image associated with the uncompressed optimized graphics commands data.

27. A computer program product that includes a non-transitory computer readable medium, the non-transitory computer readable medium comprising a plurality of computer instructions which, when executed by at least one processor, cause the at least one processor to execute a method for implementing remote graphics rendering, the method comprising:
a) generating, at a server CPU, a set of graphics commands to be transmitted from a server to a client, wherein the set of graphics commands are commands to be executed by a GPU to generate pixels for display;
b) optimizing the set of graphics commands at the server CPU by:
1) eliminating some or all primitive data, that need not be executed by a client GPU to generate pixels for rendering one or more images, from the set of graphics commands to be transmitted to the client;
2) applying precision changes to the set of graphics commands to be transmitted to the client; and
3) performing one or more data type compression algorithms on the set of graphics commands, including performing a different customized compression algorithm on each of a plurality of data streams of the set of graphics commands, the plurality of data streams comprising vertex position data, API calls, and texture coordinate data, to generate a plurality of compressed data streams representing the set of graphics commands; and c) transmitting the plurality of compressed data streams representing the optimized set of graphics commands to the client, wherein the optimized set of graphics commands is executed by the client GPU to generate pixels for rendering the one or more images.

28. A computer program product that includes a non-transitory computer readable medium, the non-transitory computer readable medium comprising a plurality of computer instructions which, when executed by at least one processor, cause the at least one processor to execute a method for implementing remote graphics rendering, the method comprising:
   a) receiving, at a client, a set of optimized graphics commands from a server, wherein the set of optimized graphics commands includes a plurality of data streams each corresponding to a different data type, the plurality of data streams comprising vertex position data, API calls, and texture coordinate data, the optimized set of graphics commands to be executed by a client GPU at the client to generate pixels for rendering one or more images;
   b) parsing the received set of optimized graphics commands using the client CPU to separate the set of optimized graphics commands into the plurality of data streams based on data types; and
   c) applying one or more decompression algorithms based at least in part on data type to the plurality of data streams representing the set of optimized graphics commands using the client CPU to form a set of uncompressed optimized graphics commands; and
   d) assembling API streams for the uncompressed optimized graphics commands using the client CPU.

* * * * *